United States Patent
Benyassine et al.

(10) Patent No.: US 7,613,291 B1
(45) Date of Patent: Nov. 3, 2009

(54) ECHO PATH CHANGE DETECTION USING DUAL SPARSE FILTERING

(75) Inventors: Adil Benyassine, Irvine, CA (US); Carlo Murgia, Aliso Viejo, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 804 days.

(21) Appl. No.: 11/201,637

(22) Filed: Aug. 10, 2005

(51) Int. Cl.
*H04M 9/08* (2006.01)

(52) U.S. Cl. .............................. 379/406.08; 379/406.01

(58) Field of Classification Search ............ 379/406.01, 379/406.08, 410, 398
See application file for complete search history.

(56) References Cited

U.S. PATENT DOCUMENTS

| | | | | |
|---|---|---|---|---|
| 4,582,963 A | * | 4/1986 | Danstrom | 379/406.08 |
| 5,341,177 A | * | 8/1994 | Roy et al. | 348/614 |
| 5,343,522 A | * | 8/1994 | Yatrou et al. | 379/406.09 |
| 5,777,910 A | * | 7/1998 | Lu | 708/323 |
| 6,219,418 B1 | * | 4/2001 | Eriksson et al. | 379/406.08 |
| 6,944,289 B2 | * | 9/2005 | Tahernezhaadi et al. | 379/406.01 |

* cited by examiner

*Primary Examiner*—Ahmad F Matar
*Assistant Examiner*—Antim Shah
(74) *Attorney, Agent, or Firm*—Farjami & Farjami LLP

(57) ABSTRACT

There is provided a method for use by an echo canceller to detect an echo path change and adjust to the echo path change. The method comprises determining a first bulk delay using a SPARSE foreground adaptive filter; configuring the foreground adaptive filter to an open-loop mode; canceling the echo signal based on the first bulk delay using the foreground adaptive filter; determining a second bulk delay of the echo signal using a SPARSE background adaptive filter; configuring the foreground adaptive filter to a closed-loop mode and continuing to cancel the echo signal based on the first bulk delay; configuring the background adaptive filter to the open-loop mode; measuring echo cancellation performance of the foreground adaptive filter and the background adaptive filter; and changing parameters of the foreground adaptive filter if the echo cancellation performance of the background adaptive filter is better than the foreground adaptive filter.

24 Claims, 5 Drawing Sheets

ECHO PATH CHANGE DETECTION USING DUAL SPARSE FILTERING

BACKGROUND OF THE INVENTION

1. Field of the Invention

The present invention relates generally to echo cancellation in communication networks. More particularly, the present invention relates to detecting an echo path change for canceling echo in communication networks.

2. Background Art

Subscribers use speech quality as the benchmark for assessing the overall quality of a telephone network. A key technology to provide a high quality speech is echo cancellation. Echo canceller performance in a telephone network, either a TDM or packet telephony network, has a substantial impact on the overall voice quality. An effective removal of hybrid and acoustic echo inherent in telephone networks is a key to maintaining and improving perceived voice quality during a call.

Echoes occur in telephone networks due to impedance mismatches of network elements and acoustical coupling within telephone handsets. Hybrid echo is the primary source of echo generated from the public-switched telephone network (PSTN). As shown in FIG. 1, hybrid echo 110 is created by a hybrid, which converts a four-wire physical interface into a two-wire physical interface. The hybrid reflects electrical energy back to the speaker from the four-wire physical interface. Acoustic echo, on the other hand, is generated by analog and digital telephones, with the degree of echo related to the type and quality of such telephones. As shown in FIG. 1, acoustic echo 120 is created by a voice coupling between the earpiece and microphone in the telephones, where sound from the speaker is picked by the microphone. The result of this reflection is the creation of multi-path echo, which would be heard by the speaker unless eliminated.

As shown in FIG. 1, in modern telephone networks, echo canceller 140 is typically positioned between hybrid 130 and network 150. Generally speaking, echo cancellation process involves two steps. First, as the call is set up, echo canceller 140 employs a digital adaptive filter to adapt to the far-end signal and create a model based on the far-end signal before passing through hybrid 130. After the local-end signal, including near-end signal and/or echo signal, passes through hybrid 130, echo canceller 140 subtracts the far-end model from the local-end signal to cancel hybrid echo and generate an error signal. Although this echo cancellation process removes a substantial amount of the echo, non-linear components of the echo may still remain. To cancel non-linear components of the echo, the second step of the echo cancellation process utilizes a non-linear processor (NLP) to eliminate the remaining or residual echo by attenuating the signal below the noise floor.

Due to changes in the echo path, echo cancellers may restart the adaptation process to readjust the echo cancellation parameters. Echo path changes may occur due to a variety of reasons such as change of handset, conferencing, muting, acoustics, call forwarding, etc. Many conventional echo cancellers do not detect the echo path change timely or properly and, as a result, the echo signal is not cancelled quickly and can be heard by the far-end caller.

In order to detect the echo path change in a timely fashion, some conventional echo cancellers use a secondary non-SPARSE filter. The non-SPARSE filter applies a full-length window to cover the entire echo path delay, which is typically about 128 ms. Such conventional echo cancellers, however, are not desirable commercially, since non-SPARSE filters are known to require an enormous amount of memory space for the long filter, and are quite complex, time consuming and costly for use in echo cancellation systems.

Accordingly, there is a need in the art for an echo canceller that can detect echo path changes quickly and properly, with a low level of complexity and memory consumption.

SUMMARY OF THE INVENTION

The present invention is directed to using an echo canceller to detect an echo path change and to adjust to such echo path change in a timely fashion. According to one aspect of the present invention, there is provided a method that comprises determining a first bulk delay of an echo signal using a foreground adaptive filter, the foreground adaptive filter being a SPARSE filter; configuring the foreground adaptive filter to an open-loop mode; canceling the echo signal based on the first bulk delay using the foreground adaptive filter; determining a second bulk delay of the echo signal using a background adaptive filter, the background adaptive filter being a SPARSE filter; configuring the foreground adaptive filter to a closed-loop mode and continuing to cancel the echo signal based on the first bulk delay; configuring the background adaptive filter to the open-loop mode; measuring an echo cancellation performance of the foreground adaptive filter and an echo cancellation performance of the background adaptive filter; and changing parameters of the foreground adaptive filter if the measuring determines that the echo cancellation performance of the background adaptive filter is better than the echo cancellation performance of the foreground adaptive filter.

In one aspect, changing the parameters includes copying one or more parameters of the background adaptive filter into respective one or more parameters of the foreground adaptive filter. Yet, in another aspect, changing the parameters includes determining a third bulk delay of the echo signal using the foreground adaptive filter; configuring the foreground adaptive filter to the open-loop mode to determine new parameters for the foreground adaptive filter; and configuring the foreground adaptive filter to the closed-loop mode to update the new parameters.

In a further aspect, the background adaptive filter is updated more aggressively in presence of a double talk detection than the foreground adaptive filter.

In an additional aspect, the method comprises moving the foreground adaptive filter to a downsample domain prior to the determining the first bulk delay; moving the foreground adaptive filter to a regular domain for canceling the echo signal based on the first bulk delay; and moving the background adaptive filter to a downsample domain prior to the determining the second bulk delay.

In one aspect, the background adaptive filter operates in the open-loop mode only. Further, the measuring may measure an echo return loss enhancement (ERLE) of the foreground adaptive filter and an ERLE of the background adaptive filter.

In another aspect, the method may also comprise determining a third bulk delay of the echo signal using the background adaptive filter if the measuring determines that the echo cancellation performance of the foreground adaptive filter is better than the echo cancellation performance of the background adaptive filter. Yet, in a further aspect, the method may comprise determining a third bulk delay of the echo signal using the background adaptive filter if the measuring determines that the foreground adaptive filter and/or the background adaptive filter are performing badly, wherein the third bulk delay is indicative of the echo path change.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
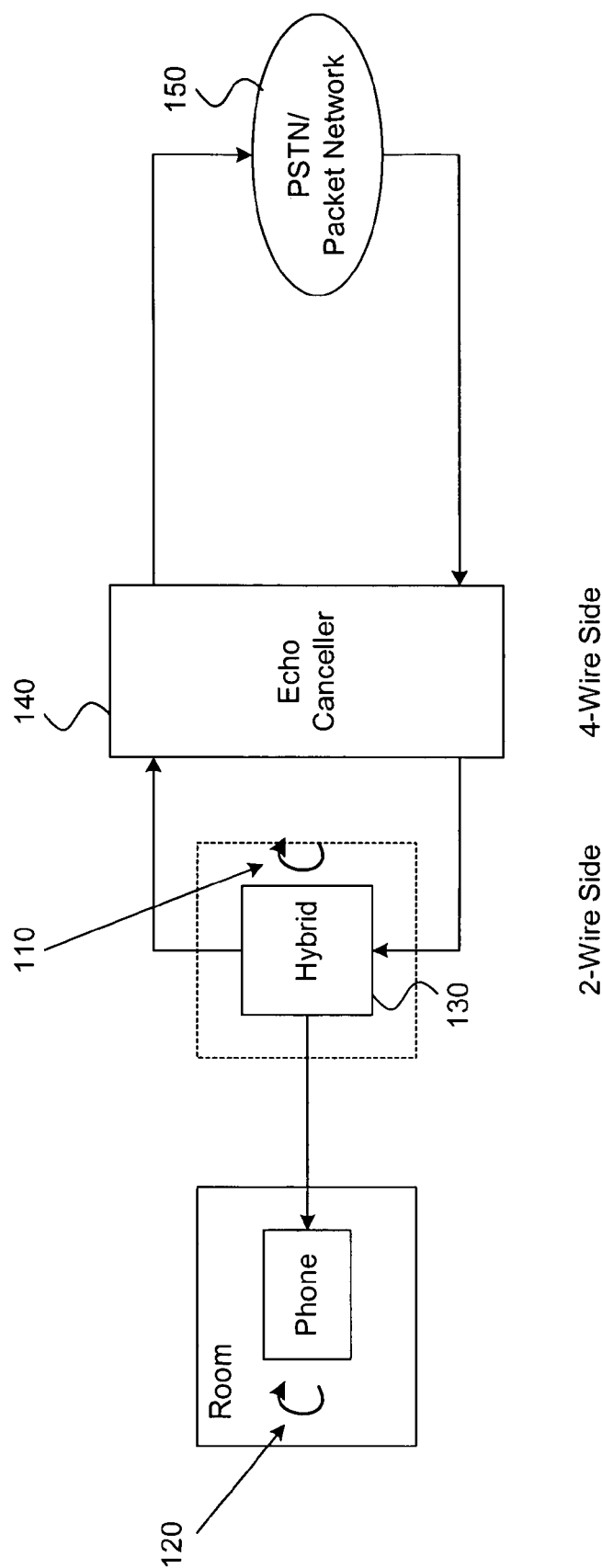
FIG. 1 illustrates a block diagram of a conventional communication system showing a placement of an echo canceller in an access network.

The present invention is directed to an echo canceller for detecting an echo path change and adjusting to such echo path change. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
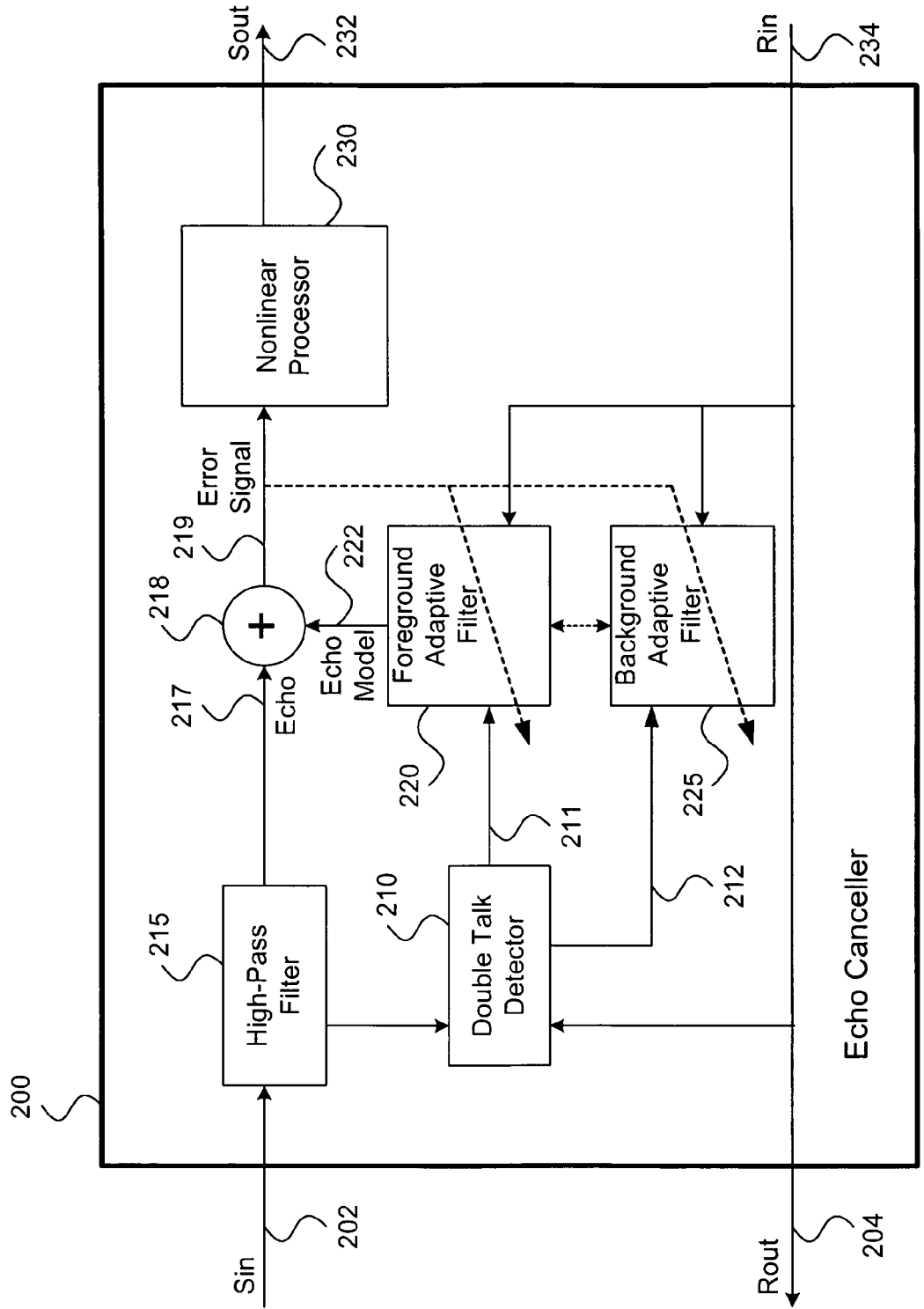
FIG. 2 illustrates a block diagram of an echo canceller, according to one embodiment of the present invention.

FIG. 2 illustrates block diagram of echo canceller 200, according to one embodiment of the present invention. As shown, echo canceller 200 includes double talk detector 210, high-pass filter 215, foreground adaptive filter 220, background adaptive filter 225, error estimator 218 and nonlinear processor 230. During its operation, echo canceller 200 receives Rin signal 234 from the far end, which is fed to double talk detector 210, and then passed through to the hybrid, e.g. see hybrid 130 of FIG. 1, as Rout signal 204 to the near end. As discussed above, the hybrid causes Rout signal 204 to be reflected as Sin signal 202 from the near end, which is fed to high pass filter 215, and an output of high pass filter 215 is fed to double talk detector 210. High-pass filter 215, which is placed at the transmitting side of echo canceller 200, removes DC component from Sin signal 202.

Double talk detector 210 controls the behavior of foreground adaptive filter 220 by providing foreground double talk indication 211 during periods when Sin signal 202 from the near end reaches a certain level. Because echo canceller 200 is utilized to cancel an echo of Rin signal 234 from the far end, presence of speech signal from the near end would cause foreground adaptive filter 220 to converge on a combination of near end speech signal and Rin signal 234, which will lead to an inaccurate echo path model, i.e. incorrect foreground adaptive filter 220 coefficients. Therefore, in order to cancel the echo signal, foreground adaptive filter 220 should not train in the presence of the near end speech signal. To this end, echo canceller 200 must analyze the incoming signal and determine whether it is solely an echo signal of Rin signal 234 or also contains the speech of a near end talker. By convention, if two people are talking over a communication network or system, one person is referred to as the "near talker," while the other person is referred to as the "far talker." The combination of speech signals from the near end talker and the far end talker is referred to as "double talk."

To determine whether Sin signal 202 contains double talk, double talk detector 210 estimates and compares the characteristics of Rin signal 234 and Sin signal 202. A primary purpose of double talk detector is to prevent foreground adaptive filter 220 from adaptation when double talk is detected or to adjust the degree of adaptation based on confidence level of double talk detection, which is described in U.S. Pat. No. 6,804,203, entitled "Double Talk Detector for Echo Cancellation in a Speech Communication System", which is hereby incorporated by reference in its entirety.

Echo canceller 200 utilizes foreground adaptive filter 220 to model the echo path and its delay. In one embodiment, foreground adaptive filter 220 uses a transversal filter with adjustable taps, where each tap receives a coefficient that specifies the magnitude of the corresponding output signal sample and each tap is spaced a sample time apart. The better the echo canceller can estimate what the echo signal will look like, the better it can eliminate the echo. To improve the performance of echo canceller 200, it may be desirable to vary the adaptation rate at which the transversal filter tap coefficients of foreground adaptive filter 220 are adjusted. For instance, if double talk detector 210 denotes a high confidence level that the incoming signal is an echo signal, it is preferable for foreground adaptive filter 220 to adapt quickly. On the other hand, if double talk detector 210 denotes a low confidence level that the incoming signal is an echo signal, i.e. it may include double talk, it is preferable to decline to adapt at all or to adapt very slowly. If there is an error in determining whether Sin signal 202 is an echo signal, a fast adaptation of foreground adaptive filter 220 causes rapid divergence and a failure to eliminate the echo signal.

As shown in FIG. 2, foreground adaptive filter 220 produces echo model signal 222 based on Rin signal 234 from the far end. Error estimator 218 receives echo signal 217, which is the output of high-pass filter 215, and subtracts echo model signal 222 from echo signal 217 to generate residual echo signal or error signal 219. Foreground adaptive filter 220 also receives error signal 219 and updates its coefficients based on error signal 219.

It is known that the echo path includes nonlinear components that cannot be removed by foreground adaptive filter 220 and, thus, after subtraction of echo model signal 222 from echo signal 217, there remains residual echo, which must be eliminated by nonlinear processor (NLP) 230. As shown NLP 230 receives residual echo signal or error signal 219 from error estimator 218 and generates Sout 232 for transmission to far end. If error signal 219 is below a certain level, NLP 230 replaces the residual echo with either comfort noise if the comfort noise option is enabled, or with silence if the comfort noise option is disabled.

With continued reference to FIG. 2, echo canceller 200 also includes background adaptive filter 225, which receives Rin signal 234 from the far-end and error signal 219. Both foreground adaptive filter 220 and background adaptive filter 225 are SPARSE filters and employ adaptive filter algorithms with a dynamically positioned window to cover a desired echo tail length. In such embodiment, echo canceller 200 uses a sliding window, e.g. a 24 ms window, covering an echo path delay, e.g. a 128 ms delay. To properly cancel the echo, echo canceller 200 must determine pure delay or bulk delay, which is indicative of the location of the echo signal segment or window within the 128 ms echo path delay. Foreground adaptive filter 220 is designed to adapt more conservatively than background adaptive filter 225. Although the embodiment of FIG. 2 utilizes an adaptive filter for the foreground filter, in other embodiments, the foreground filter may not be an adaptive filter.

As shown in FIG. 2, double talk detector 210 controls the behavior of background adaptive filter 225 by providing background double talk indication 212 during periods when Sin signal 202 from the near end reaches a certain level; however, background double talk indication 212 is determined less stringently than foreground double talk indication 211, and as a result, background adaptive filter 220 adapts more aggressively than foreground adaptive filter 220 in presence of double talk. Echo canceller 200 utilizes background adaptive filter 225 to detect an echo path change by, for example, comparing the performance of background adaptive filter 225 with foreground adaptive filter 220. Because background adaptive filter 225 is more aggressive than foreground adaptive filter 220, when an echo path change occurs, background adaptive filter 225 locates the new bulk delay quicker than foreground adaptive filter 220 and, as a result, background adaptive filter 225 converges more quickly and displays a better echo cancellation performance than foreground adaptive filter 220. In one embodiment, the performance of foreground adaptive filter 220 and background adaptive filter 225 are measured based on an echo return loss enhancement (ERLE) of each filter, which can be described as the energy difference between Sin signal 202 and error signal 227, as a gain parameter that is defined in dB.

In one embodiment, when echo canceller 200 determines that background adaptive filter 225 has a better performance than foreground adaptive filter 220, one or more parameters of background adaptive filter 225 may be copied into foreground adaptive filter 220. Yet, in another embodiment, once echo canceller 200 determines that background adaptive filter 225 has a better performance than foreground adaptive filter 220, foreground adaptive filter 220 may be initialized to start adapting again.

Figures 1, 3:
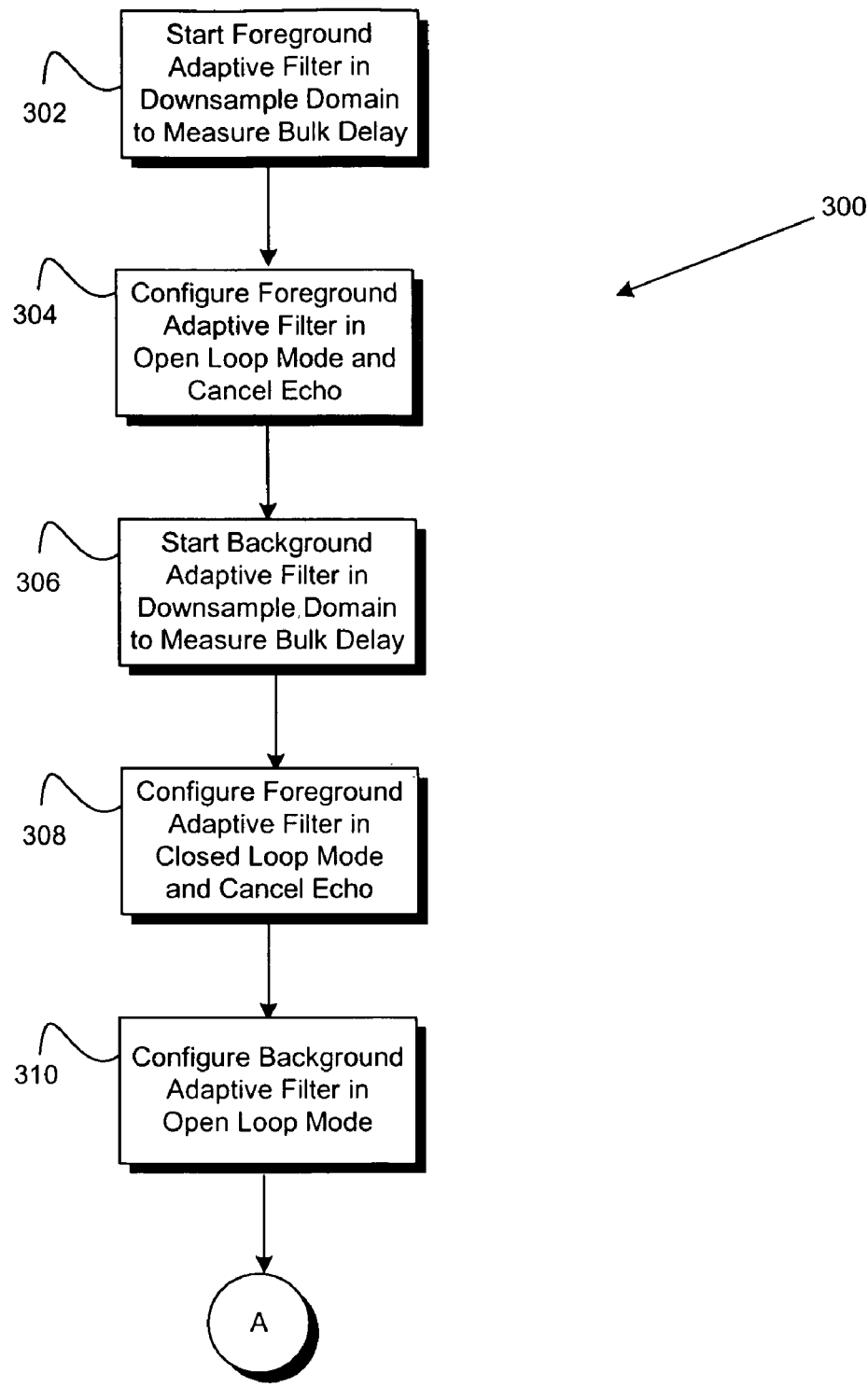
FIG. 3 illustrates a flow diagram for echo path change detection and adjustment process, according to one embodiment of the present invention.
Figures 2, 3:
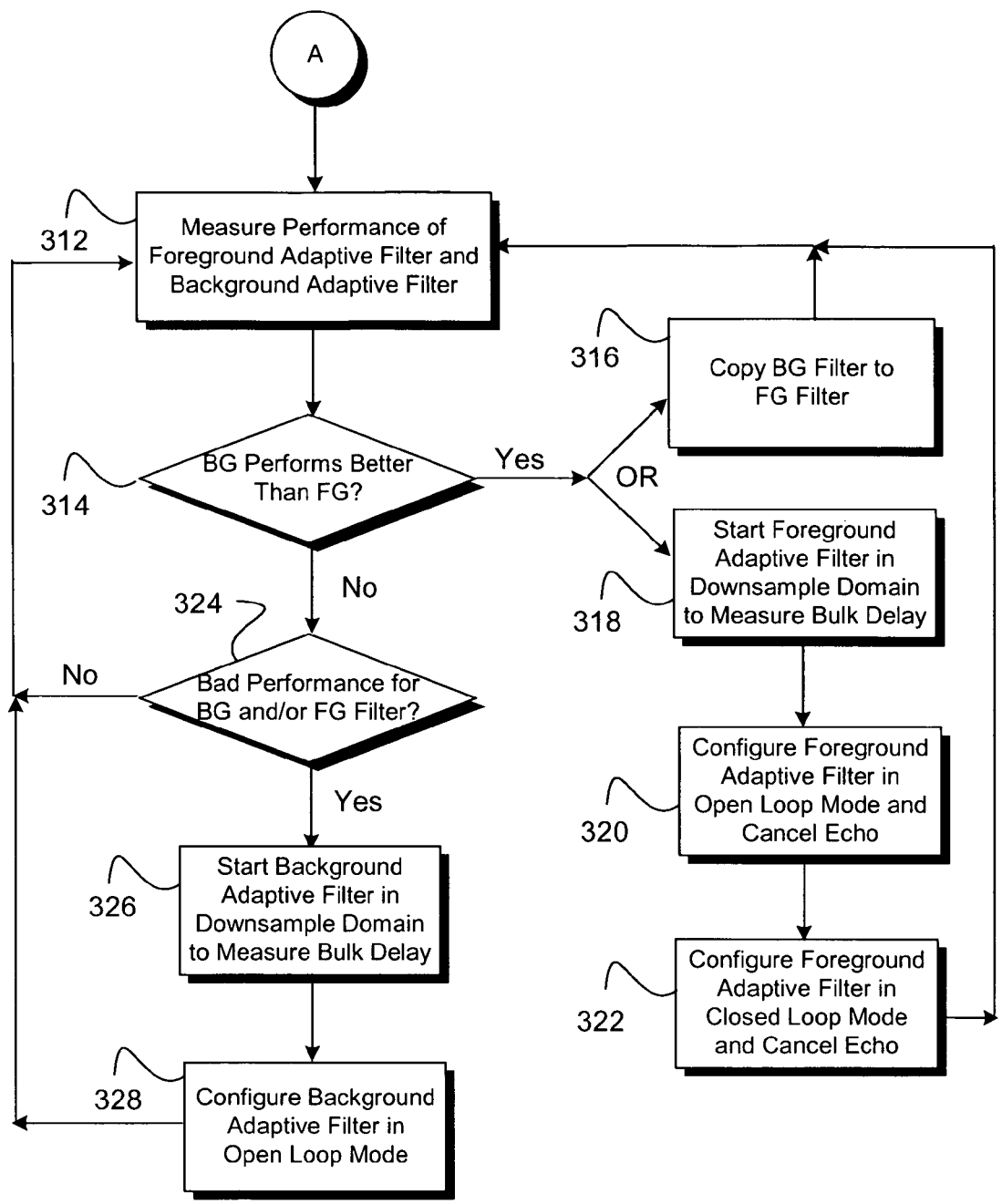

FIG. 3 illustrates a flow diagram for echo path change detection and adjustment process 300, according to one embodiment of the present invention. As shown, echo path change detection and adjustment process 300 begins at step 302, where foreground adaptive filter 220 is configured to operate in a downsample domain. In one embodiment, foreground adaptive filter 220 is downsampled by four (4). In other words, rather than requiring 1024 filter taps for an echo path delay of 128 ms, foreground adaptive filter 220 is downsampled to require 256 filter taps. While in the downsample domain, foreground adaptive filter 220 determines the bulk delay to find the location the echo within the echo path delay. Next, at step 304, foreground adaptive filter 220 is configured to operate in an open-loop mode, which means that the filter taps or coefficients are adapted more aggressively than in a closed-loop mode. In step 304, foreground adaptive filter 220 starts to cancel the echo based on the bulk delay determined in step 302.

After a period of time, at step 306, background adaptive filter 225 is configured to operate in the downsample domain. In one embodiment, background adaptive filter 225 is downsampled by four (4). In other words, rather than requiring 1024 filter taps for an echo path delay of 128 ms, background adaptive filter 225 is downsampled to require 256 filter taps. While in the downsample domain, background adaptive filter 225 determines the bulk delay to find the location of the echo within the echo path delay.

Next, at step 308, foreground adaptive filter 220 is configured to operate in a closed-loop mode, which means that the filter taps or coefficients are adapted less aggressively than in the open-loop mode. Further, at step 310, background adaptive filter 225 is configured to operate in an open-loop mode, where the filter taps or coefficients are adapted more aggressively than in the closed-loop mode. It should be noted that the sequence of the steps in echo path change detection and adjustment process 300 can be changed without departing from the scope of the present invention.

At step 312, echo canceller 200 measures the performance of both foreground adaptive filter 220 and background adaptive filter 225. In one embodiment, the performance is measured by determining the ERLE for each filter, which can be described as the energy difference between Sin signal 202 and error signal 227, as a gain parameter that is defined in dB. At step 314, the ERLE of foreground adaptive filter 220 is compared against the ERLE of background adaptive filter 225. If the performance of background adaptive filter 225 is better than that of foreground adaptive filter 220, in one embodiment, echo path change detection and adjustment process 300 moves to step 316, or in another embodiment, echo path change detection and adjustment process 300 moves to step 318. At step 316, one or more parameters of background adaptive filter 225 are copied into respective parameters of foreground adaptive filter 220 to make foreground adaptive filter 220 operate as good as background adaptive filter 225. Yet, if echo path change detection and adjustment process 300 moves to step 318, foreground adaptive filter 220 is configured to operate in the downsample domain again to locate a new bulk delay, as in step 302. Next, at step 320, foreground adaptive filter 220 is configured to operate in an open-loop mode, as in step 304, where the filter taps or coefficients are adapted more aggressively. In step 320, foreground adaptive filter 220 starts to cancel the echo at the new location of bulk delay determined in step 318. Further, after a period of time, at step 322, foreground adaptive filter 220 is configured to operate in the closed-loop mode, as in step 308, where the filter taps or coefficients are adapted less aggressively than in the open-loop mode.

Turning back to step 314, if the performance of background adaptive filter 225 is not better than that of foreground adaptive filter 220, echo path change detection and adjustment process 300 moves to step 324, where it is determined whether background adaptive filter 225 and/or foreground adaptive filter 220 are having a bad performance, e.g., background adaptive filter 225 could not be canceling the echo properly and/or foreground adaptive filter 220 is not canceling the echo properly. If it is determined that background adaptive filter 225 and/or foreground adaptive filter 220 are having a bad performance, echo path change detection and adjustment process 300 moves to step 326, where background adaptive filter 225 is configured to operate in the downsample domain again to locate a new bulk delay, as in step 306. Next, at step 328, background adaptive filter 225 220 is configured to operate in an open-loop mode, as in step 310, where the filter taps or coefficients are adapted more aggressively than in the closed-loop mode. However, if it is determined that background adaptive filter 225 and/or foreground adaptive filter 220 are not performing badly, echo path change detection and adjustment process 300 moves to step 312, where echo canceller 200 continues to measure the performance of both foreground adaptive filter 220 and background adaptive filter 225.

Figure 4:
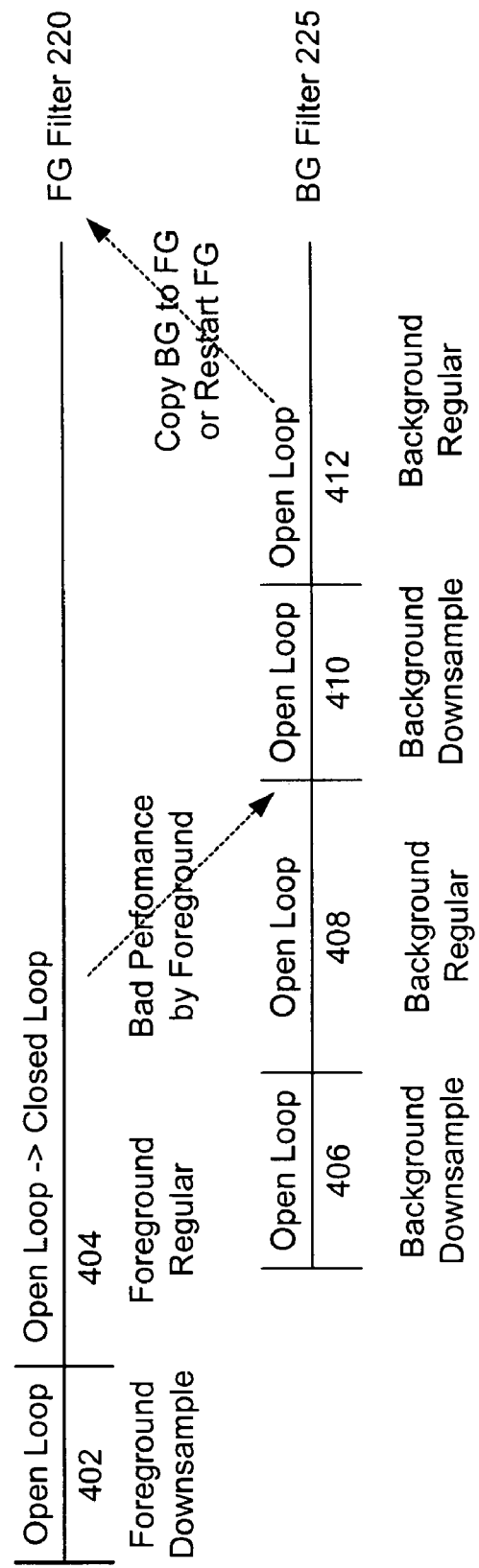
FIG. 4 illustrates a timeline diagram of foreground and background SPARSE filters of the echo canceller of FIG. 2, according to the echo path change detection and adjustment process of FIG. 3.

FIG. 4 illustrates a timeline diagram of foreground adaptive filter 220 and background adaptive filter 225, according to echo path change detection and adjustment process 300. As shown, foreground adaptive filter 220 starts in the downsample domain at time slot 402 and moves to regular domain at time slot 404 for echo cancellation. Further, the timeline diagram illustrates that foreground adaptive filter 220 starts in the open-loop mode and then moves to the closed-loop mode after a period of time. However, in contrast, background adaptive filter 225 remains in the open-loop mode for the entire time, which makes background adaptive filter 225 more aggressive than foreground adaptive filter 220. As a result, background adaptive filter 225 adapts quicker to an echo path change than foreground adaptive filter 220. Further, background adaptive filter 225 continues adapting more aggressively in presence of a certain level of double talk, whereas the degree of adaptation of foreground adaptive filter 220 is less.

As further shown in FIG. 4, background adaptive filter 225 starts in the downsample domain at time slot 406. Next, background adaptive filter 225 moves to regular domain at time slot 408. If it is determined that background adaptive filter 225 and/or foreground adaptive filter 220 are performing badly, background adaptive filter 225 enters the downsample domain at time slot 410 to locate a new bulk delay. It should be noted that in some embodiments, background adaptive filter 225 may enter the downsample domain at time slot 410 after a period of time regardless of the performance of background adaptive filter 225 and/or foreground adaptive filter. Further, in other embodiments, background adaptive filter 225 may move to step 326 to determine a new bulk delay if it is determined that foreground adaptive filter 220 has a better performance than background adaptive filter 225. Next, at time slot 412, background adaptive filter 225 returns to the regular domain, and either the parameters of background adaptive filter 225 are copied into the respective parameters of foreground adaptive filter 220, or foreground adaptive filter 220 restarts in the downsample domain if it is determined that, in time slot 412, background adaptive filter 225 has better performance than foreground adaptive filter 220.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by an echo canceller having a foreground adaptive filter and a background adaptive filter to detect an echo path change and adjust to said echo path change, said method comprising:

determining a first bulk delay of an echo signal using said foreground adaptive filter, said foreground adaptive filter being a SPARSE filter;

configuring said foreground adaptive filter to an open-loop mode;

canceling said echo signal from a local-end signal based on said first bulk delay using said foreground adaptive filter, wherein canceling said echo signal from said local-end signal generates an error signal;

feeding said error signal to both said foreground adaptive filter and said background adaptive filter;

determining a second bulk delay of said echo signal using said background adaptive filter, said background adaptive filter being a SPARSE filter;

configuring said foreground adaptive filter to a closed-loop mode and continuing to cancel said echo signal from said local-end signal based on said first bulk delay;

configuring said background adaptive filter to said open-loop mode;

measuring an echo cancellation performance of said foreground adaptive filter and an echo cancellation performance of said background adaptive filter; and changing parameters of said foreground adaptive filter if said measuring determines that said echo cancellation performance of said background adaptive filter is better than said echo cancellation performance of said foreground adaptive filter.

2. The method of claim 1, wherein said changing said parameters includes copying one or more parameters of said background adaptive filter into respective one or more parameters of said foreground adaptive filter.

3. The method of claim 1, wherein said changing said parameters includes:

determining a third bulk delay of the echo signal using said foreground adaptive filter;

configuring said foreground adaptive filter to said open-loop mode to determine new parameters for said foreground adaptive filter; and configuring said foreground adaptive filter to said closed-loop mode to update said new parameters.

4. The method of claim 1, wherein said background adaptive filter is updated more aggressively in presence of a double talk detection than said foreground adaptive filter.

5. The method of claim 1 further comprising:

moving said foreground adaptive filter to a downsample domain prior to said determining said first bulk delay; and moving said foreground adaptive filter to a regular domain for canceling said echo signal from said local-end signal based on said first bulk delay.

6. The method of claim 1 further comprising:

moving said background adaptive filter to a downsample domain prior to said determining said second bulk delay.

7. The method of claim 1, wherein said background adaptive filter operates in said open-loop mode only.

8. The method of claim 1, wherein said measuring measures an echo return loss enhancement (ERLE) of said foreground adaptive filter and an ERLE of said background adaptive filter.

9. The method of claim 1 further comprising:

determining a third bulk delay of said echo signal using said background adaptive filter if said measuring determines that said echo cancellation performance of said foreground adaptive filter is better than said echo cancellation performance of said background adaptive filter.

10. The method of claim 1 further comprising:
determining a third bulk delay of said echo signal using said background adaptive filter if said measuring determines that said foreground adaptive filter and/or said background adaptive filter are performing badly.

11. The method of claim 10, wherein said third bulk delay is indicative of said echo path change.

12. The method of claim 1, wherein said determining said second bulk delay occurs prior to configuring said foreground adaptive filter to said closed-loop mode.

13. An echo canceller capable of detecting an echo path change and adjusting to said echo path change, said echo canceller comprising:
a foreground adaptive filter configured to determine a first bulk delay of an echo signal, wherein said foreground adaptive filter is a SPARSE filter, and wherein said foreground adaptive filter is further configured to an open-loop mode, cancels said echo signal from a local-end signal based on said first bulk delay and generates an error signal, and wherein said foreground adaptive filter is configured to a closed-loop mode after being configured to said open-loop mode, and wherein said foreground adaptive filter continues to cancel said echo signal from said local-end signal based on said first bulk delay in said closed-loop mode; and
a background adaptive filter configured to determine a second bulk delay of said echo signal, wherein said background adaptive filter is a SPARSE filter, and wherein said background adaptive filter is further configured to said open-loop mode after determining said second bulk delay;
wherein said error signal is fed to both said foreground adaptive filter and said background adaptive filter, and wherein said echo canceller measures an echo cancellation performance of said foreground adaptive filter and an echo cancellation performance of said background adaptive filter, and changes parameters of said foreground adaptive filter if said echo canceller determines that said echo cancellation performance of said background adaptive filter is better than said echo cancellation performance of said foreground adaptive filter.

14. The echo canceller of claim 13, wherein said echo canceller changes said parameters by copying one or more parameters of said background adaptive filter into respective one or more parameters of said foreground adaptive filter.

15. The echo canceller of claim 13, wherein said echo canceller changes said parameters by:
determining a third bulk delay of the echo signal using said foreground adaptive filter;
configuring said foreground adaptive filter to said open-loop mode to determine new parameters for said foreground adaptive filter; and
configuring said foreground adaptive filter to said closed-loop mode to update said new parameters.

16. The echo canceller of claim 13, wherein said background adaptive filter is updated more aggressively in presence of a double talk detection than said foreground adaptive filter.

17. The echo canceller of claim 13, wherein said foreground adaptive filter determines said first bulk delay in a downsample domain, and wherein said foreground adaptive filter moves to a regular domain for canceling said echo signal from said local-end signal based on said first bulk delay.

18. The echo canceller of claim 13, wherein said background adaptive filter determines said second bulk delay in a downsample domain.

19. The echo canceller of claim 13, wherein said background adaptive filter operates in said open-loop mode only.

20. The echo canceller of claim 13, wherein said echo canceller measures an echo return loss enhancement (ERLE) of said foreground adaptive filter and an ERLE of said background adaptive filter.

21. The echo canceller of claim 13, wherein said background adaptive filter determines a third bulk delay of said echo signal if said echo canceller determines that said echo cancellation performance of said foreground adaptive filter is better than said echo cancellation performance of said background adaptive filter.

22. The echo canceller of claim 13, wherein said background adaptive filter determines a third bulk delay of said echo signal if said echo canceller determines that said foreground adaptive filter and/or said background adaptive filter are performing badly.

23. The echo canceller of claim 22, wherein said third bulk delay is indicative of said echo path change.

24. The echo canceller of claim 13, wherein said echo background adaptive filter determines said second bulk delay prior to said foreground adaptive filter is configured to said closed-loop mode.

* * * * *